United States Patent
Kao et al.

(10) Patent No.: US 9,755,928 B2
(45) Date of Patent: Sep. 5, 2017

(54) METHOD, SERVER AND APPARATUS FOR ESTABLISHING POINT-TO-POINT CONNECTION

(71) Applicants: ThroughTek Technology (ShenZhen) Co., Ltd., Shenzhen (CN); ThroughTek Co., Ltd., Taipei (TW)

(72) Inventors: Yu-Li Kao, Taipei (TW); Wen-Kai Ho, Taipei (TW); Kuo-Tung Chien, Taipei (TW)

(73) Assignees: Throughtek Technology (Shenzhen) Co., Ltd., Shenzhen (CN); Throughtek Co., Ltd., Taipei (TW)

( * ) Notice: Subject to any disclaimer, the term of this patent is extended or adjusted under 35 U.S.C. 154(b) by 231 days.

(21) Appl. No.: 14/700,759

(22) Filed: Apr. 30, 2015

(65) Prior Publication Data

US 2015/0365443 A1 Dec. 17, 2015

(30) Foreign Application Priority Data

Jun. 13, 2014 (TW) .............................. 103120401 A (51) Int. Cl.
*H04L 29/06* (2006.01)
*H04L 12/26* (2006.01)
*H04L 29/08* (2006.01)

(52) U.S. Cl.
CPC ........ *H04L 43/0811* (2013.01); *H04L 67/141* (2013.01); *H04L 67/34* (2013.01); *H04L 67/148* (2013.01)

(58) Field of Classification Search
CPC ............... H04L 67/141; H04L 41/0806; H04L 63/0272; H04L 67/34; H04L 43/0811; H04L 61/256; H04L 67/148; H04L 67/322

USPC .......................................................... 709/224
See application file for complete search history.

(56) References Cited

U.S. PATENT DOCUMENTS

| | | | | |
|---|---|---|---|---|
| 7,706,362 | B1 * | 4/2010 | Senthilnathan | H04L 12/4633 370/389 |
| 2005/0144260 | A1 * | 6/2005 | Han | H04L 29/12311 709/219 |
| 2007/0288630 | A1 * | 12/2007 | De Noia | H04L 29/06 709/224 |
| 2011/0134885 | A1 * | 6/2011 | Wu | H04L 12/2859 370/331 |
| 2012/0198040 | A1 * | 8/2012 | Kuo | H04L 41/00 709/223 |

FOREIGN PATENT DOCUMENTS

| | | |
|---|---|---|
| CN | 1756213 A | 4/2006 |
| CN | 101057460 A | 10/2007 |
| CN | 102480526 A | 5/2012 |
| TW | 201320695 A | 5/2013 |

* cited by examiner

*Primary Examiner* — Ruolei Zong
(74) *Attorney, Agent, or Firm* — Muncy, Geissler, Olds & Lowe, P.C.

(57) ABSTRACT

When a first device is establishing a point-to-point connection with a second device, a server provides connection instructions for assistance. The connection instructions define multiple connection flows. When the connection instructions are received, the first device attempts a first connection flow under a priority order. If failed, another connection is tried by the first device. The server monitors connection status and adjusts the connection instructions according to statistics and circumstances.

18 Claims, 12 Drawing Sheets

METHOD, SERVER AND APPARATUS FOR ESTABLISHING POINT-TO-POINT CONNECTION

CROSS-REFERENCES TO RELATED APPLICATIONS

This non-provisional application claims priority under 35 U.S.C. §119(a) on Patent Application No. 103120401 filed in Taiwan, R.O.C. on 2014 Jun. 13, the entire contents of which are hereby incorporated by reference.

FIELD OF INVENTION

The present invention relates to a method, a server and an apparatus for establishing a point-to-point connection and more particularly relates to a method, a server and an apparatus for establishing a point-to-point connection dynamically.

BACKGROUND OF INVENTION

Various electronic apparatuses are developed for improving human life. Nevertheless, there are still many technical issues to make these electronic apparatuses more convenient to increase their applications. Today, most network environment is composed of multiple homogeneous or heterogeneous sub networks. For example, the Internet serves as a main body, and multiple gateways and routers are used to connect private local networks used at home, or private networks behind telecommunication service providers. Under such configuration, if a user wants to connect two terminal devices via a point-to-point connection, it is still very complicated particularly when the two terminal devices are located at different sub-networks. Specifically, if the two terminal devices are located behind different NAT (Network Address Translation) devices, they may have separate private network addresses. In addition, it is always challenging to efficiently and easily establish a network connection.

SUMMARY OF INVENTION

An objective of the present invention is to provide a method, a server and an apparatus to improve dynamic point-to-point connection setting.

A preferred embodiment of the present invention is a point-to-point connection method for assisting a first device to establishing a point-to-point connection to a second device via a server. The point-to-point connection method includes the steps that the server receives a connection request from the first device and the server retrieves connection parameters for point-to-point connecting to the second device. In addition to provide the connection parameters, the point-to-point connection method also includes providing connection instructions to the first device. The connection instructions correspond to an operating method and the operating method corresponds to at least one connection flows. The first device dynamically determines how to use each connection flow and establishes the point-to-point connection to the second device according to the connection instructions and the connection parameters. In addition to the first device, the second device may also retrieve connection parameters and/or corresponding connection instructions.

In a preferred embodiment, the operating method includes a priority order for multiple connection flows. The operating method may also indicate a timeout for each connection flow. When one connection flow is tried but fails to establish the point-to-point connection within the associated timeout, the first device tries another connection flow.

In addition, the connection instructions may include definitions of corresponding connection flows. The definition may include program codes to be executed on the first device to perform corresponding connection flows. Alternatively, the definition may include pseudo codes to be converted and operate the first device to perform corresponding connection flows. The number of the pseudo codes or the program codes may vary under different designs.

The first device receives the connection instructions and determines whether not to adjust or how to adjust its connection method for trying more than one connection flows. In other words, the connection instructions may correspond to the connection method and further correspond to parameters like timeout for each associated connection flow.

The server may monitor the connection status of the point-to-point connection between the first device and the second device and the server may adjust continued connection instructions. The server may also receive a connection report from the first device and use the connection report to adjust continued connection instructions. For example, the first device may collect its connection status and generates a connection report dynamically and/or periodically. Such connection report reflects connection error, timing or other information that are helpful for perform connection optimization.

The connection instructions may indicate a point-to-point server to assist the first device to establish the point-to-point connection to the second device. When the point-to-point connection between the first device and the second device is interrupted the point-to-point server may relay data transmission between the first device and the second device until the point-to-point connection between the first device and the second device is recovered.

In addition, the connection flow may include a first connection flow and a second connection flow. The first connection flow indicates that the point-to-point connection between the first device and the second device is relayed by the server. The second connection flow indicates that the point-to-point connection between the first device and the second device is not relayed by the server. The first connection flow may be used at initial stage of the connection between the first device and the second device. After the point-to-point connection between the first device and the second device is established, the first connection flow may be replaced with the second connection flow.

In addition, preferred embodiments may also include corresponding servers and electronic apparatuses for improving convenience and efficiency for improving point-to-point connection.

DETAILED DESCRIPTION

In order to explain the present invention in more details, the following examples as well as associated drawings are provided.

Figure 1:
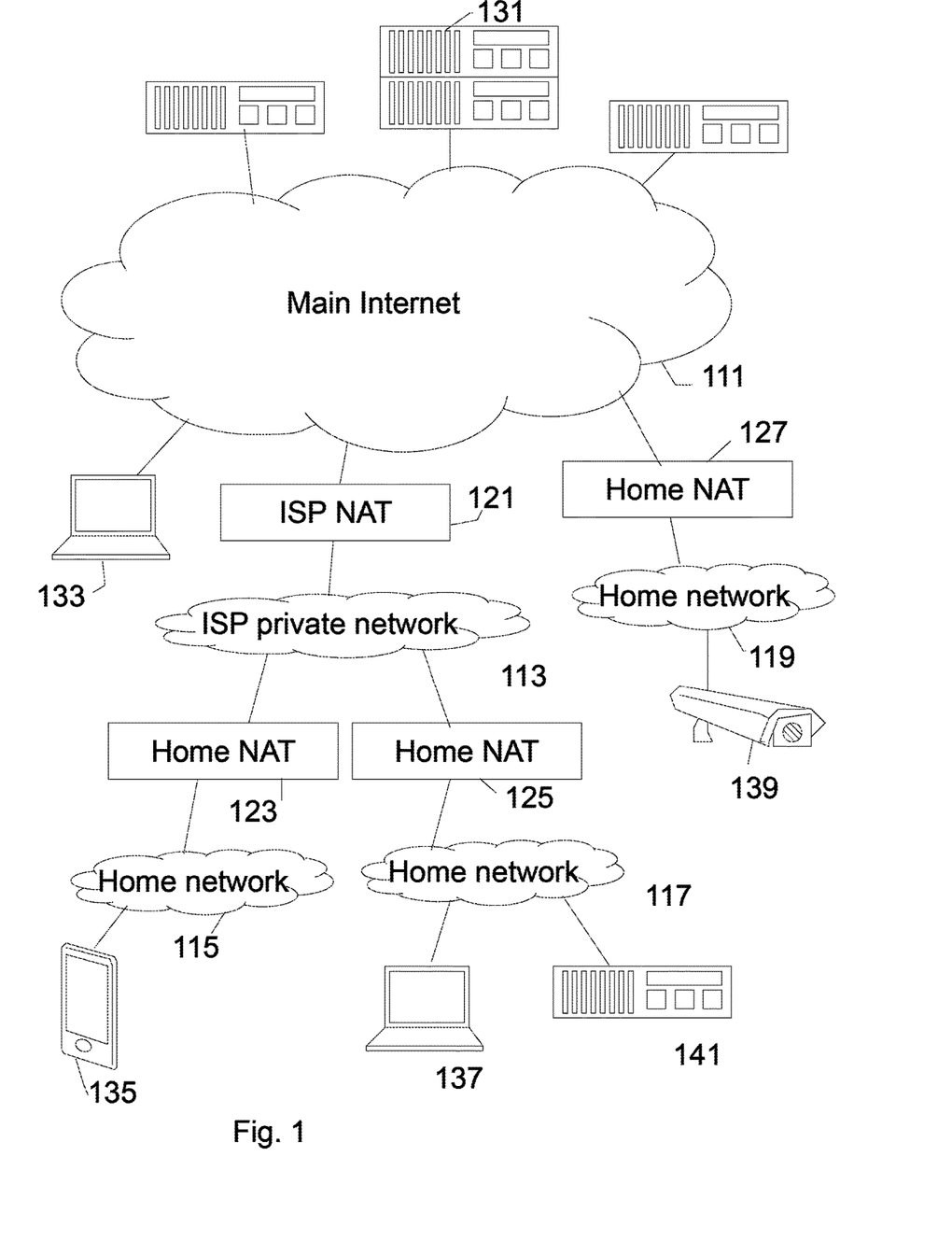
FIG. 1 illustrates an environment for preferred embodiments of the present invention to operate therein.

Please refer to FIG. 1, which illustrates multiple types of devices connected to a network. In this example, the network is composed of multiple sub networks. For example, a server 131 or a computer 133 on the Internet 111 is assigned an IPv4 or IPv6 address. Each device may be accessed by other devices according its unique IP address. In addition, there are various routers, gateways, wire and/or wireless transmission channels for connecting devices and handling naming service, routing service and data transmission.

In addition to the Internet 111, some devices connect to the Internet 111 via ISPs (Internet Service Providers). Usually, ISPs use NAT (Network Address Translation) devices to map limited IPv4 or IPv6 addresses to private IP addresses in the private networks 113 of the ISPs so that the devices in the private networks 113 may share network resources. According to RFC1918 there are three types of private network addresses for different number of private network addresses. Specifically, 10.0.0.0-10.255.255.255 provide 16,777,216 private network addresses, 172.16.0.0.-17.31.255.255 provide 1,048,576 private network addresses and 192.168.0.0-192.168.255.255 provide 65,536 private network addresses.

One private network address may represent different devices in different private networks. Therefore, if only relying on these private network addresses, a router in the Internet 111 is not able to identify a destination device for sending data. For example, if the computer 133 requests to access a device in a private network 113 of an ISP, the NAT public IP address of the ISP is provided to the computer 133. Then, the NAT of the ISP needs to find out which private network address should be associated as the destination address for data to be transmitted.

There are various ways to implement NAT. In addition, under real network environments, NAT may even have nested combinations. For example, two home NAT devices 123 and 125 are located in a private network 113 of an ISP. The home NAT device 123 and the home NAT device 125 have their own private home network 115 and home network 117. On these home networks, various terminal devices like a mobile phone 135, a computer 137 and a server 141 are connected thereon.

Because the home NAT device 123 and the home NAT device 125 are located in a private network 113 of an ISP, their out-going IP addresses may be private network addresses like 192.168.1.131 provided by a NAT device 121 of the ISP. If the computer 133 requests to transmit data to the mobile phone 135, routers or other related devices need the public address of the NAT 121 of the ISP, the private network address of the home NAT device 123 and even the private IP address of the mobile phone 135.

Further detailed information may be found in RFC1918 like how devices in a private network are connected to the Internet 111, e.g. connecting to a web server. However, due to complexity of network environment and various NAT designs, it is very complicated to establish a point-to-point connection between any two devices.

For example, a mobile phone 135 requests to establish a point-to-point connection to an IP camera 139 located in a home network 119 controlled by a home NAT device 127. Because the mobile phone 135 and the IP camera 139 are located at different private networks, the mobile phone 135 cannot access the IP camera 139 with the private network address of the IP camera 139 directly. Furthermore, due to the existence of the home NAT device 127 cannot access the IP camera 139 with the public IP address of the home NAT device 127, either. In some other environments, firewalls or other network devices make point-to-point connection even more complicated. In the following, several embodiments are explained with associated drawings.

Figure 2:
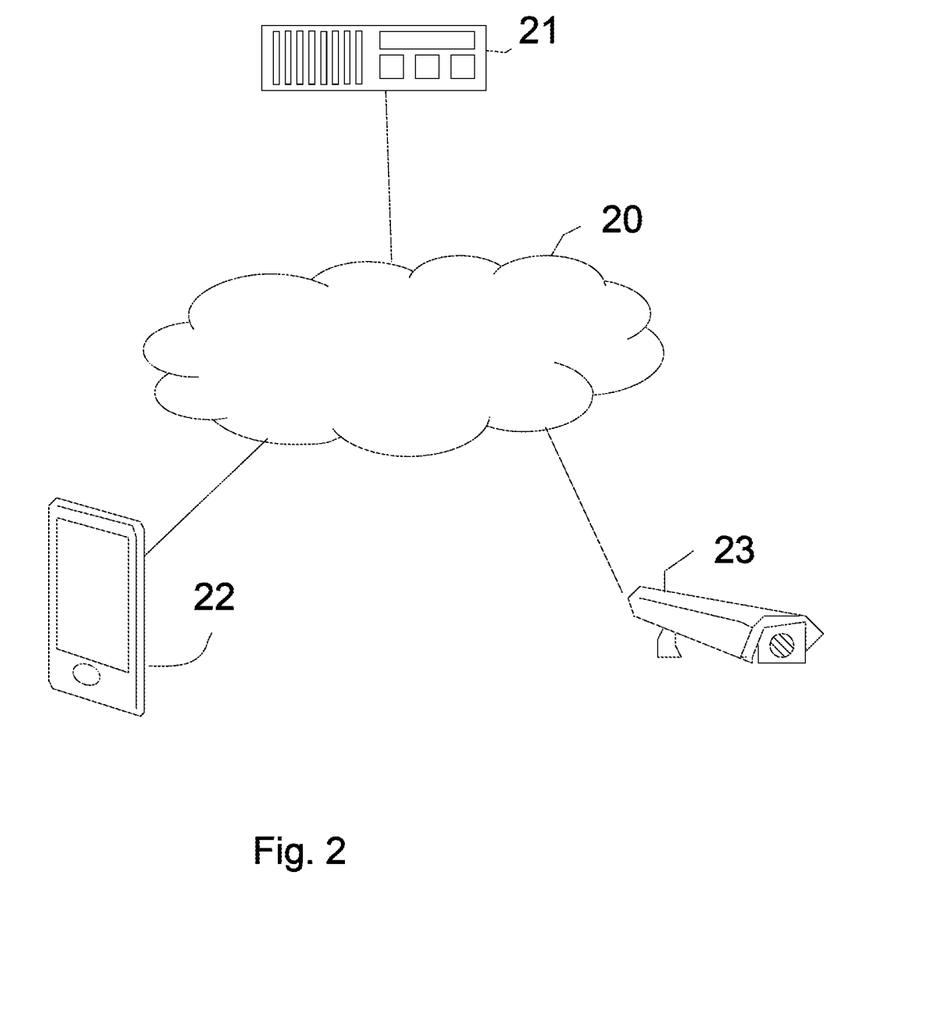
FIG. 2 is an architecture diagram of a preferred embodiment according to the present invention.

Please refer to FIG. 2, which illustrates a mobile phone 22 as a first device to establish a point-to-point connection to an IP camera 23 as a second device. There is also a server 21 in the network 20 of the mobile phone 22 and the IP camera 23. The network 20 may refer to the Internet, a private network, a network composed of multiple sub-networks including corresponding routers, gateways, switches, satellites, VPN (virtual private network), wire or wireless, and/or telecommunication networks.

In some case, to establish a point-to-point connection between the mobile phone 22 and the IP camera 23, IP addresses of the other party are sufficient to perform data transmission between the mobile phone 22 and the IP camera 23. However, like what is shown in FIG. 1 or other circumstances, the mobile phone 22 may be located in a private network controlled by a NAT device. On the other hand, the IP camera 23 may be located in another private network controlled by another NAT device.

Even so, if the mobile phone 22 and the IP camera 23 are enabled to connect to network, usually, the mobile phone 22 and the IP camera 23 may at least be connected to some server like a server 21 in the Internet of FIG. 2. The server 21 usually has a static IP address or has a dynamic IP address via DNS (Dynamic Naming Service) to identify its IP address in the network.

Figure 3A:
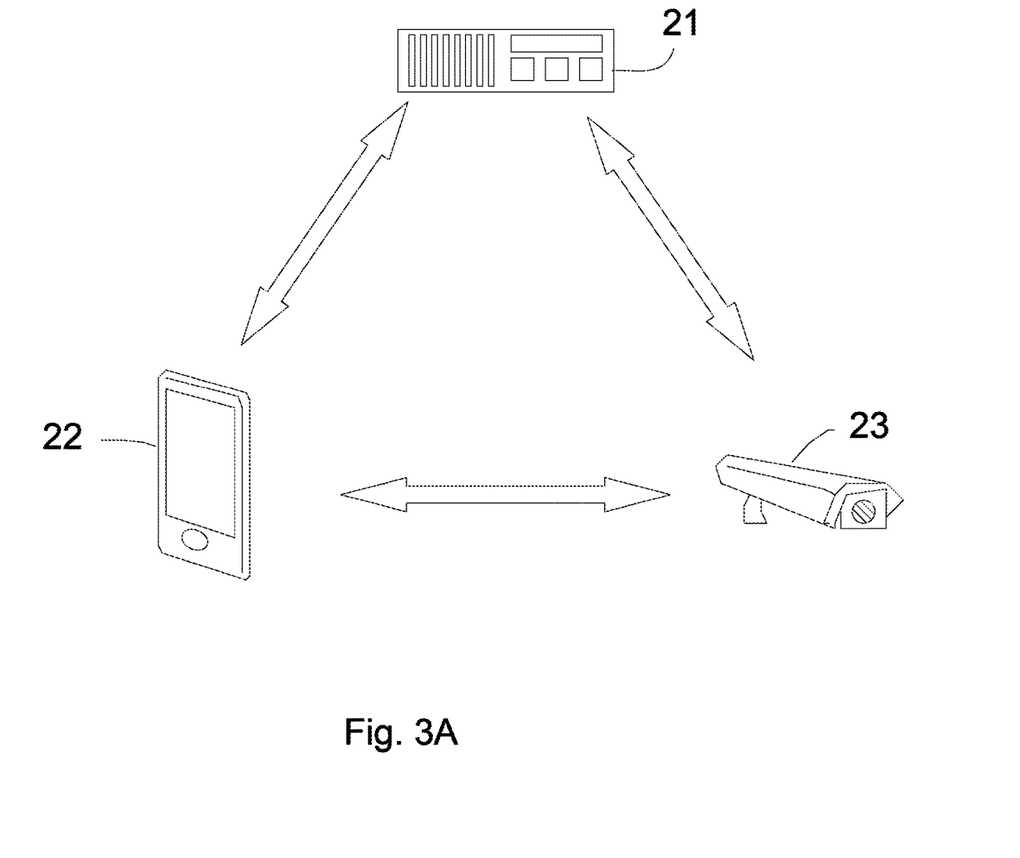
FIG. 3A illustrates interaction among a server, a client device and a device in an embodiment according to the present invention.

Please refer to FIG. 3A, which illustrates an embodiment to establish a point-to-point connection between the mobile phone 22 and the IP camera 23. First, the mobile phone 22 sends a point-to-point connection request to the server 21. The server 21 tries to retrieve one or more connection parameters of the IP camera 23 for the mobile phone 22 to establish a point-to-point connection to the IP camera 23. The connection parameters may include IP addresses or other ways for identifying locations, including but not limited to the IP address of the IP camera 23 reported to the server 21. Sometimes, when the IP camera 23 is located in a private network and assigned an IP address by a NAT device, the server 21 records the out-going IP address of the NAT device and related connection parameters. As mentioned above, there may be more devices than the number of available IP addresses allocated to the NAT device, port numbers and other related information of the NAT device are also collected so as to connect back to devices in the private network.

In real applications, the server 21 not only transmits the IP address and related connection parameters of the IP camera 23 to the mobile phone 22 but also transmits the IP address and related connection parameters of the mobile phone 22 back to the IP camera 23 so as to use various point-to-point skills of hole punching to establish a point-to-point connection between the mobile phone 22 and the IP camera 23. In other words, the first device and the second device may retrieve connection parameters of the other side and uses necessary hole punching skills to perform the point-to-point connection.

Figure 3B:
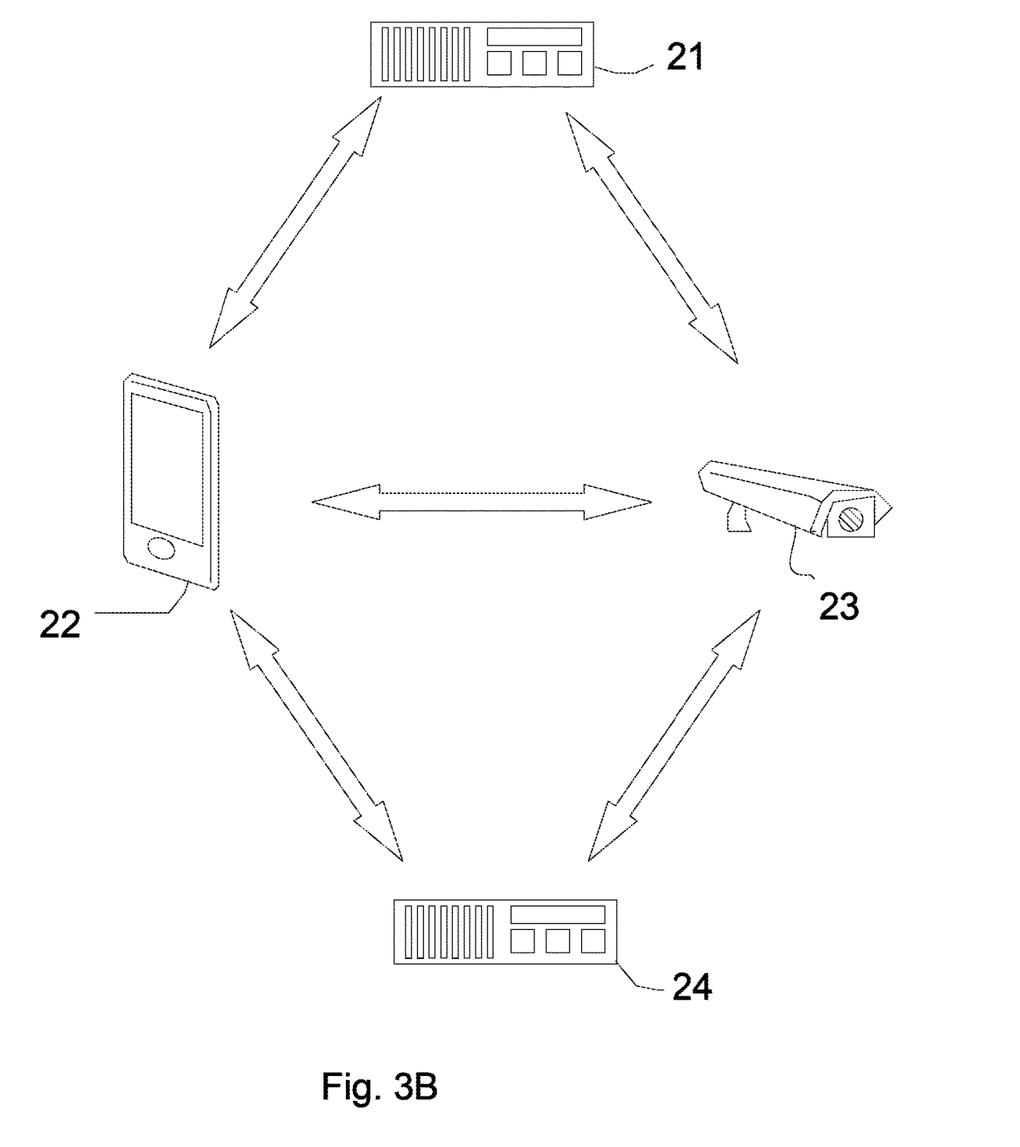
FIG. 3B illustrates an interaction among a server, a client device and a point-to-point server in an embodiment of the present invention.

When more devices rely on the server 21 to establish point-to-point connection, the server 21 may become a bottleneck. Therefore, FIG. 3B illustrates a point-to-point server 24 allocated to the mobile phone 22 to assist the mobile phone 22 to establish the point-to-point connection to the IP camera 23. In real design, there may be more than one point-to-point servers working together to provide such service. In addition, to optimize connection efficiency, the server 21 may choose one from multiple point-to-point servers 24 to assist different devices to establish point-to-point connections, e.g. to processing connection requests, providing connection parameters and/or connection instructions.

Because there are various connection scenarios between the mobile phone 22 and the IP camera 23, the server 21 also provides connection instructions in addition to the connection parameters as mentioned above. The connection instructions indicate one more connection flows for the mobile phone 22 to use the connection parameters to establish the point-to-point connection to the IP camera 23. When the mobile phone 22 receives such connection instructions and connection parameters, the mobile phone 22 starts trying one or more connection flows in serial or in parallel to establish the point-to-point connection to the IP camera 23.

The connection flows may refer to a series of steps executed by the mobile phone 22 to establish the point-to-point connection to the IP camera 23. Because there are different network connection possibilities, the mobile phone 22 is provided with multiple candidate connection flows. Some connection flows may be slower or unstable than others and some connection flows may fail to work under certain circumstances.

For example, under some worst case, the mobile phone 22 needs the server 21 to help relay all data transmission between the mobile phone 22 and the IP camera 23. For example, the mobile phone 22 and/or the IP camera 23 may be located behind strict firewalls rejecting any access except for normal websites. In some cases, when the mobile phone 22 and the IP camera 23 are located in the same private network, they only need private addresses of the other side to successfully establish the point-to-point connection. Under some other cases, the mobile phone 22 needs to have the IP address of the NAT device of the IP camera 23 and the port number of the IP camera 23 to access the server 21.

More details for breaking NAT connection problems may be found in hole punching documents like UDP hole punching, TCP hole punching, ICMP hole punching, Session Traversal Utilities for NAT, Traversal Using Relay NAT, NAT-T Negotiation of NAT-Traversal in the IKE, Teredo tunneling using NAT traversal, Session Border Controller, RSIP, Middlebox communication (MIDOCM), SOCKS, NAT PMP, UPnP, IGD and Application gateways.

In addition to follow a predetermined order to statically execute pre-stored procedures on the mobile phone 22, the mobile phone 22 may dynamically determine how to use multiple connection flows according to the connection parameters and the connection instructions from the server 21 to establish the point-to-point connection to the IP camera 23.

Figure 4A:
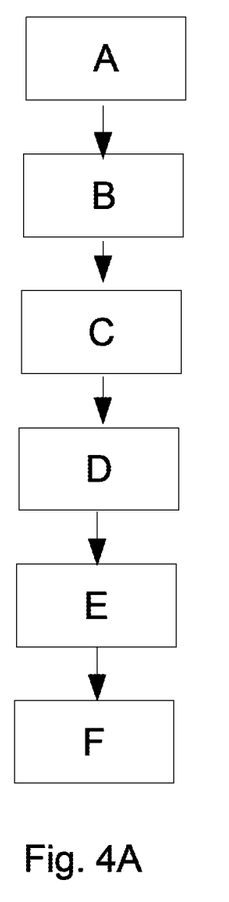
FIG. 4A illustrates a priority order among multiple connection flows.

In FIG. 4A, there are six connection flows A, B, C, D, E and F, and each connection flow is associated to a series of corresponding connecting steps. These connection flows may be ordered and assigned priority sequence defined by the connection instructions. For example, to establish a point-to-point connection, some connection flows may be tried before other connection flows. Some connections may have higher priority to try even other connection flows are also effective for point-to-point connections. As illustrated, the connection flow A is tested first, e.g. to check whether the IP camera 23 is in the same private network as the mobile phone 22, and if such case happens, their private network addresses are directly used for establishing the point-to-point connection between the mobile phone 22 and the IP camera 23. Other connection flows B, C, D, E and F may refer to other ways for establish the point-to-point connection between the mobile phone 22 and the IP camera 23.

The connection instructions may also include timeout parameters for each corresponding connection flow. Specifically, when a connection flow tries more than a corresponding timeout like 1.5 seconds but fails to establish the point-to-point connection, another connection flow is tried next. Specifically, the connection instructions are sent to the mobile phone 22 and the IP camera 23. When receiving the connection instructions, the mobile phone 22 and the IP camera 23 retrieves information like the timeout parameters in the connection instructions and determine whether to adjust or how to adjust their connection method, like to adjust the timeout parameter corresponding to each connection flow.

Figure 4B:
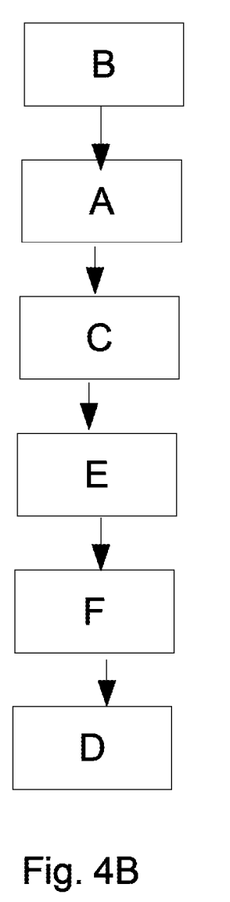
FIG. 4B illustrates another priority among multiple connection flows.

In FIG. 4B, the connection flows are ordered in different priority sequences and such priority sequence may be adjusted by the server 21 dynamically. In some embodiments, the server 21 monitors the connection status to find out which connection flows are better than others to achieve more stability and/or more efficient under different environments and circumstances. Some priority sequences may work better than others in some cases, but in other cases, such priority sequences may need adjustment to achieve better performance. Factors that may be taken into consideration on stability and efficiency may include, but not limited to, network environment where devices are located within, performance of the devices, and/or efficiency of the connection flows. Sometimes, when there are multiple ways to point-to-point connect two devices, some may need to spend more communication fee because of using telecommunication networks, such concern may also be taken into consideration by the server 21 for determining whether or how to use the connection flows.

Figure 4C:
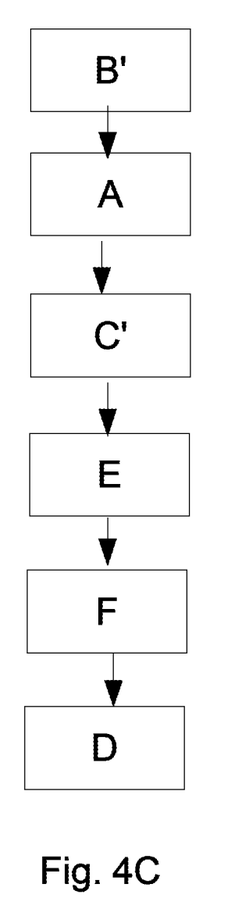
FIG. 4C illustrates another priory order among multiple connection flows.

As illustrated in FIG. 4C, in addition to change sequence among the connection flows, each connection flow may be further optimized. Specifically, the server 21 may provide an updated connection flow B' to replace the original connection flow B and provide an updated connection C' to replace the original connection flow C. As mentioned above, such replacement may be an enhancement of the coding or algorithm or adjustment according to specific parameters of the mobile phone 22, the IP camera 23 and their network environment.

The connection instructions may keep the same during the whole connection session of the mobile phone 22 and the IP camera 23. The connection instructions may be adjusted during one connection session. The connection instructions may be composed of program codes or pseudo codes to be executed and operated on the mobile phone 22 and the IP camera 23. Alternatively, the connection instructions may only include indicators corresponding connection flows if associated program codes or control logic are already stored on the mobile phone 22 and/or the IP camera 23.

In addition, as illustrated in FIG. 4A, FIG. 4B and FIG. 4C, the connection flows may be tried one after another in serial or tried all at once or partially in parallel. Besides, the connection instructions may include certain conditions for determining whether some connection flows are skipped or some connection flows are adopted directly in some circumstances.

Figure 5A:
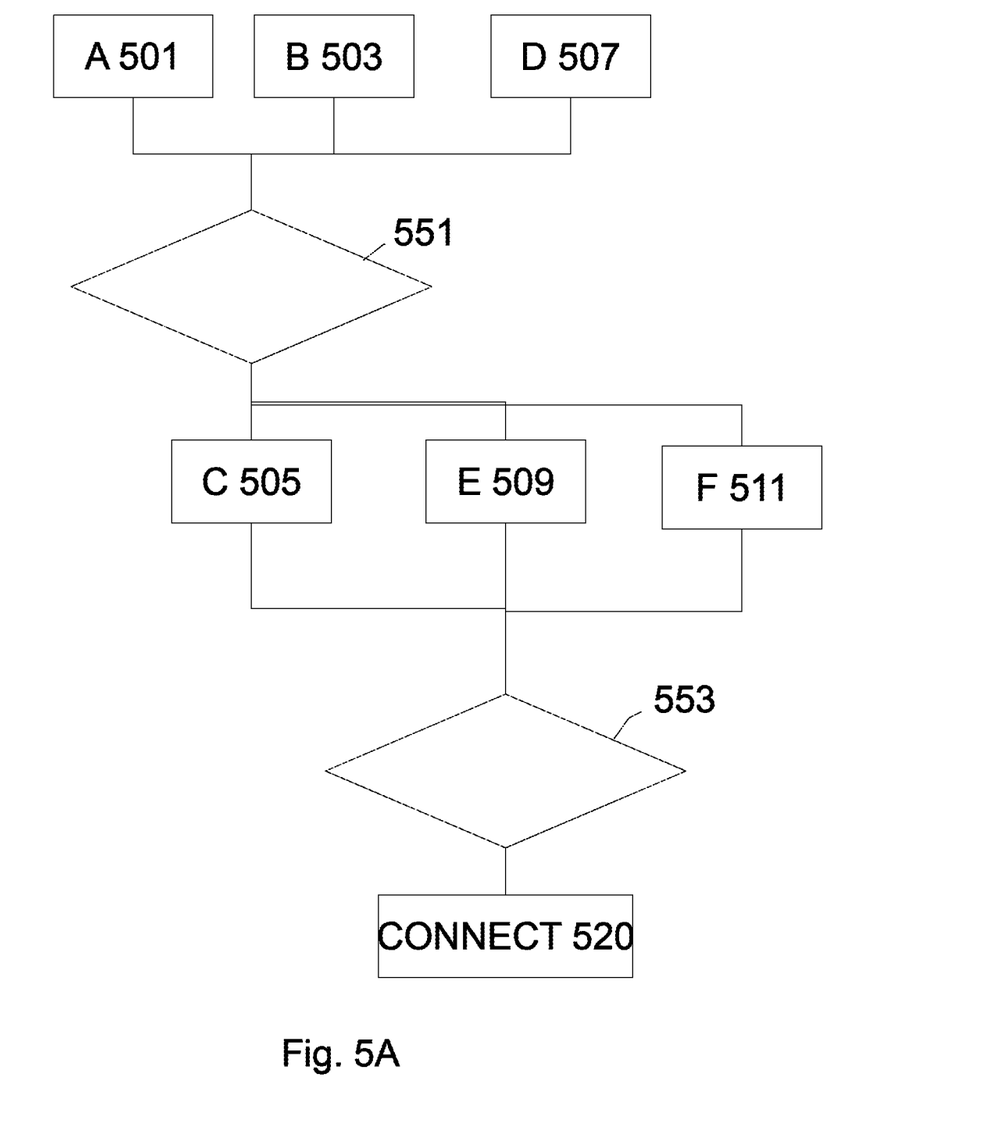
FIG. 5A illustrates an instruction for defining logic order among multiple connection flows.
Figure 5B:
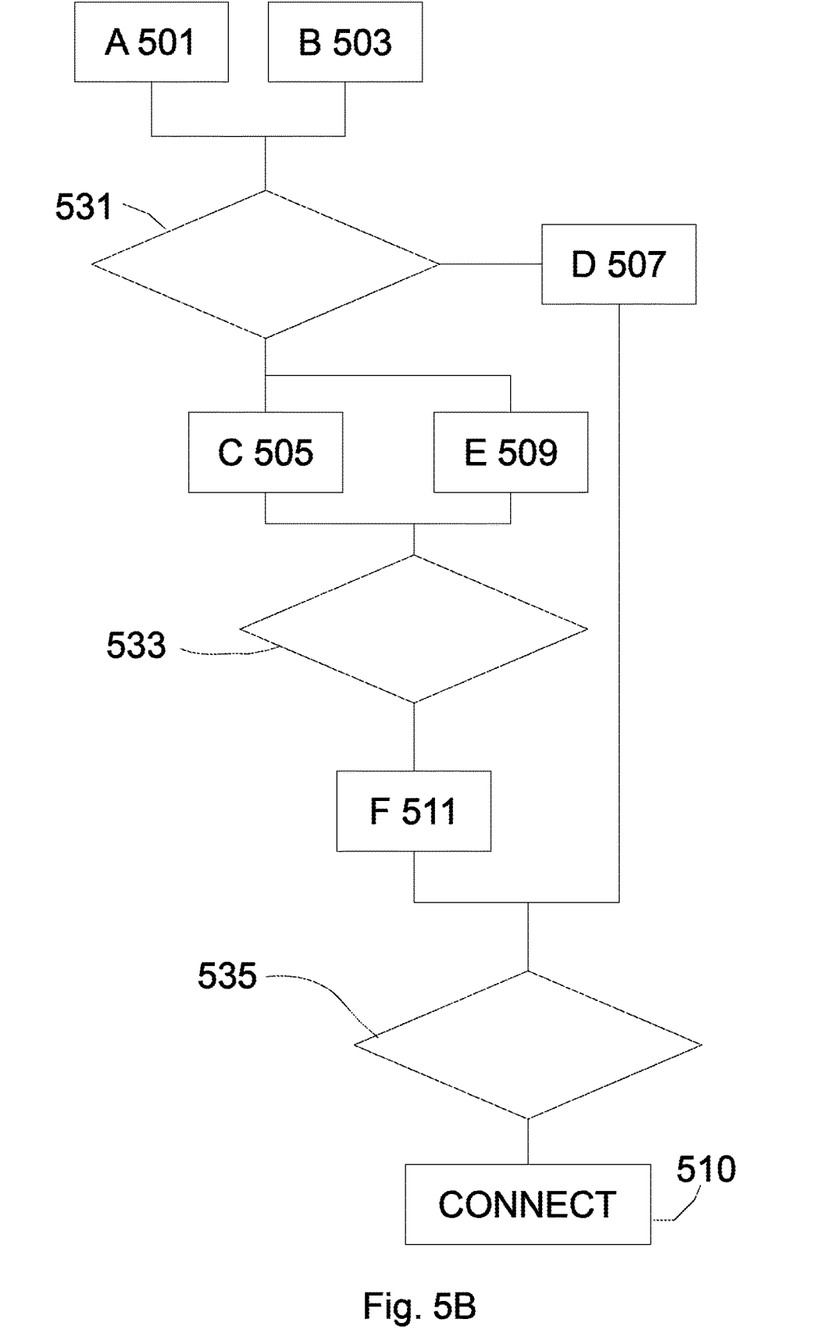
FIG. 5B illustrates another instruction for defining logic order among multiple connection flows.

FIG. 5A and FIG. 5B illustrate two different connection instructions. In FIG. 5A, the connection flows A 501, B 503 and D 507 are tried (step 551) in parallel to find out which is better for the point-to-point connection. If none works, the connection flows C 505, E 509 and F 511 are tried (step 553) to check whether the point-to-point connection may be established. A connection strategy is determined accordingly (step 520) for establishing the point-to-point connection. Sometimes, the connection status is collected by the server 21 or the point-to-point servers 24. There may be multiple candidate connection flows for establishing the point-to-point connection but only one or some are chosen under different circumstances.

FIG. 5B illustrates a different connection instruction. The connection flow A 501 and the connection flow B 503 are tried at first. In step 531, the connection status is determined. When some condition is satisfied, the connection flow D 507 is tried and in other condition, the connection flow C 505 and the connection flow E 509 are tried. In step 533, another condition is tested and the connection flow F 511 is adopted if the condition is met. The connection status of the connection flow D 507 and the connection status of the connection flow F 511 are compared in step 535 and a better connection flow is chosen (step 510) accordingly.

Please note that the mobile phone 22 and the IP camera 23 are only used for example, not to limit the scope of the present invention. More and more different devices are invented and developed in the popular Internet of Things trend, and it is always critical to find a way or another to connect these devices. For example, the mobile phone 22 may use a point-to-point connection to watch video streams captured by the IP camera 23. Other devices like watches, tablets, wearable devices, wearable glasses, sensors for collecting different signals, or robots may also use aforementioned concept to achieve point-to-point connections to other devices.

Figure 6:
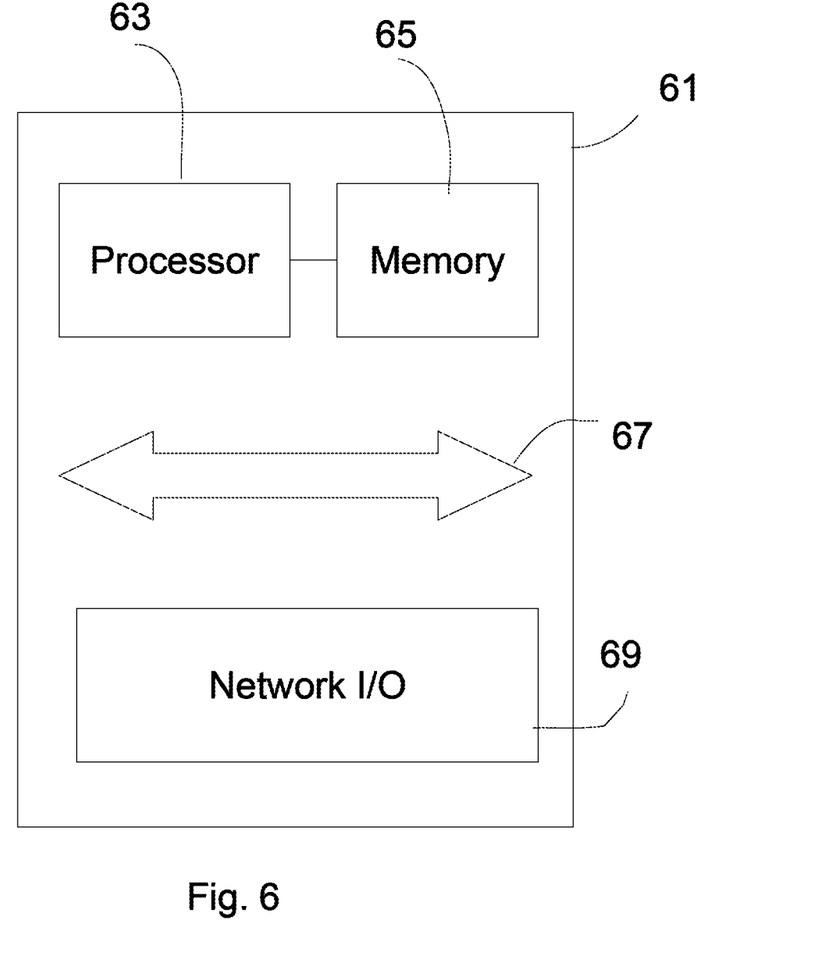
FIG. 6 illustrates a terminal device according to an embodiment of the present invention.

FIG. 6 illustrates a general architecture of an electronic apparatus 61 that may be used to implement the aforementioned point-to-point connection capability. The electronic apparatus 61 has a processor 63, an internal memory 65, a bus 67 and a network interface 69. The processor 63 loads and executes program codes in the internal memory 65 to achieve predetermined functions like mobile phone communication or IP camera functions. The processor 63 uses the bus 67 to send connection requests to the network interface 69 and the network interface 69 forwards the connection requests to the network. As mentioned above, when the server receives a connection request, the electronic apparatus 61 is replied with connection parameters and connection instructions to establish a point-to-point connection with another device.

In some cases, the connection instructions include program codes to be stored in the internal memory 65 for the processor 63 to execute. In some other cases, the connection instructions may include pseudo codes to be converted into corresponding processing logic for the processor 63 to operate accordingly. The connection flows originally stored in the internal memory 65 may also be replaced with updated connection flows in the connection instructions. In addition transmit the program codes directly to the electronic apparatus 61, an alternative way is to define timeout parameters for different connection flows or re-arrange priority sequence among multiple candidate connection flows.

The processor 63 may be normal processors like ARM or Intel processors, and may be other micro-controllers, Application Specific Integrated Chip (ASIC) or any equivalent circuits for performing corresponding logic processing. The network interface 69 may satisfy various wire or wireless network protocols, e.g. Bluetooth, Wi-Fi, RJ-45. The internal memory 65 may be DRAM, buffer, non-volatile memory, hard disk, or any one or more combinations of storages. The bus 67 may be signal transmission lines including control circuits, electronic or optical transmission networks, or any other signal transmission mechanisms.

Figure 7:
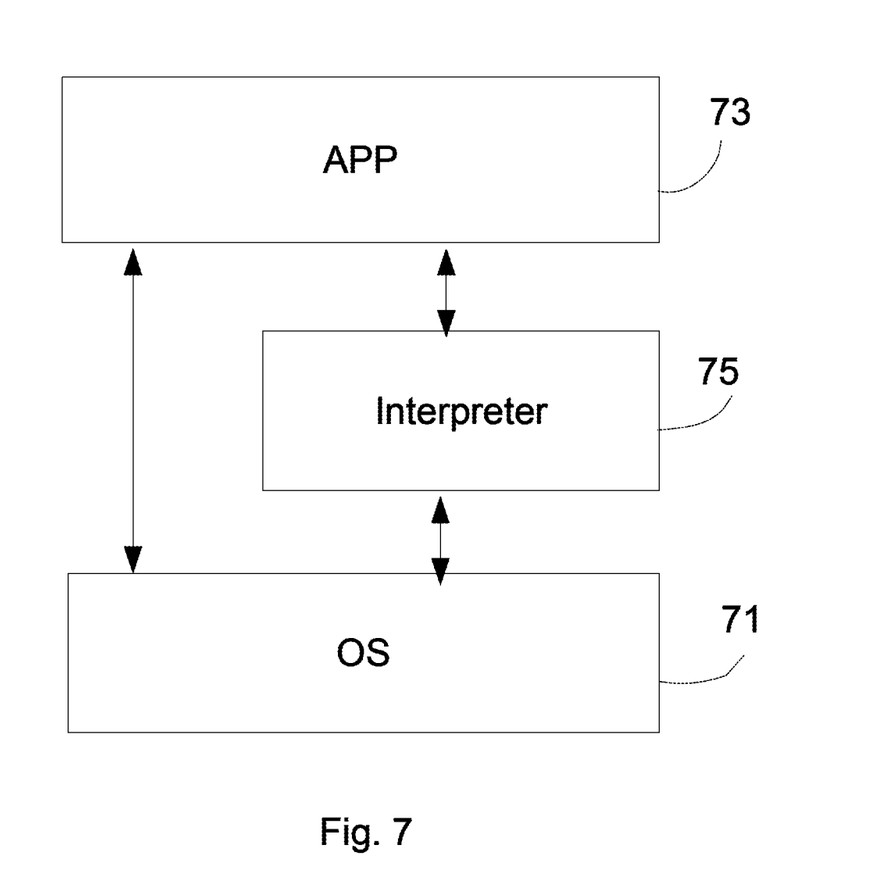
FIG. 7 illustrates a software aspect of a terminal device of a preferred embodiment of the present invention.

FIG. 7 is a software aspect of the electronic apparatus 61 of FIG. 6. As mentioned above, the server 21 may transmit program codes to electronic apparatuses like the mobile phone 22 via connection instructions. Alternatively, the server 21 may transmit pseudo codes to be further converted to corresponding execution logic to be operated on the electronic apparatus. The mobile phone 22 may have an operating system 71 like Android, iOS, Blackberry, Firefox, etc. for providing application program interface (API) for an application 73 like IP camera monitoring apps to access. The application 73 sends a connection request via the API of the operating system 71 to the sever 21 and the server 21 responds with connection instructions that may include pseudo codes. The connection instructions are accepted by the operating system 71 first and transmitted to the application 73. The application 73 sends the pseudo code to an interpreter 75 to decode and execute accordingly to establish the aforementioned point-to-point connection to connect to an IP camera. Please be noted that the example provided here is not used for limiting the scope of the invention.

Figure 8:
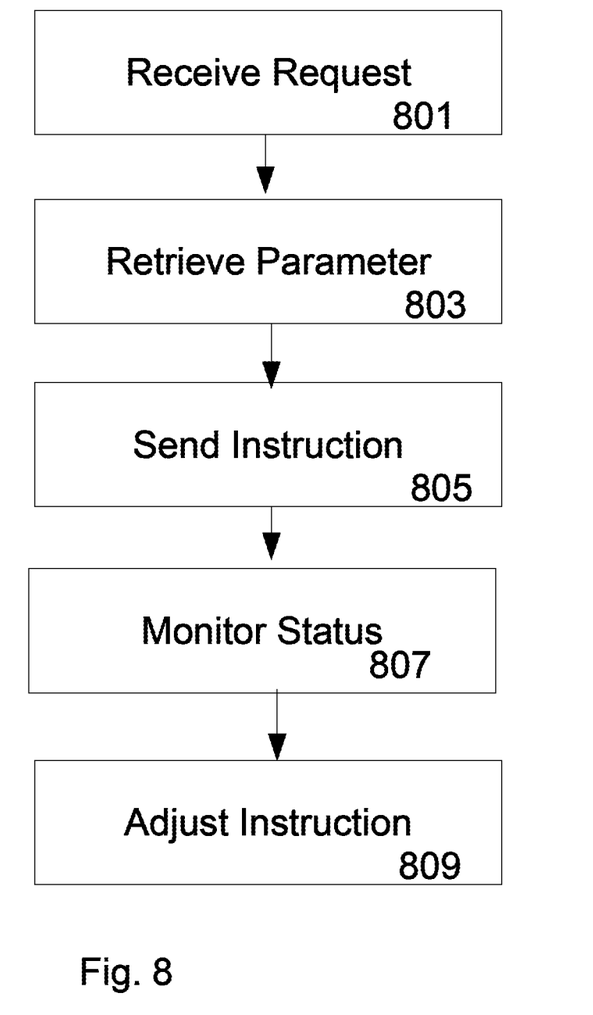
FIG. 8 illustrates an embodiment for dynamically adjust a point-to-point connection.

FIG. 8 illustrates a point-to-point connection method using a server to assist a first device to connect to a second device. The server receives a connection request (step 801). The connection request indicates that the first device requests to establish a point-to-point connection to the second device. The server retrieves the connection parameters necessary for establishing the point-to-point connection with the second device (step 803). For example, the connection parameters may include the outgoing IP address of a NAT device and a corresponding port number. In addition to provide the connection parameters of the second device to the first device, the server also provides connection instructions to the first device. The connection instructions may indicate an operating method for multiple connection flows (step 805). Each connection flow includes a series of steps for establishing a point-to-point connection. The operating method may indicate how these connection flows to be executed on the first device and may include a priority order for these connection flows. The server may also monitor the connection status between the first device and the second device (step 807) and adjusts continued connection instructions accordingly (step 809) to inform the first device to change how to operate these connection flows.

Figure 9:
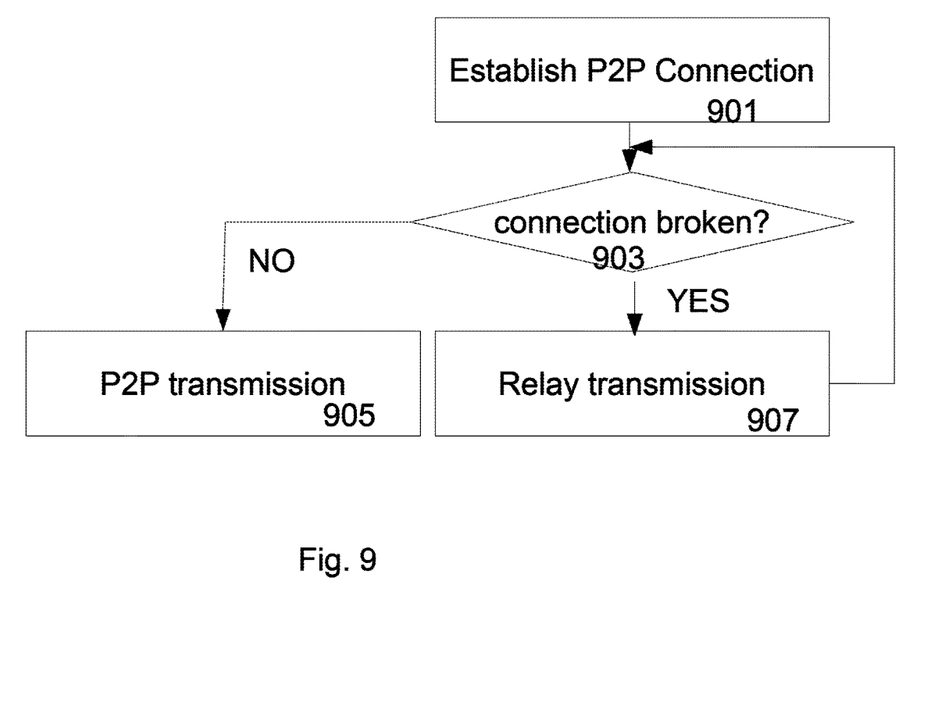
FIG. 9 illustrates a temporary data transmission when the point-to-point connection is interrupted.

FIG. 9 illustrates an embodiment of establishing a point-to-point connection. In this embodiment, the first device and the second device are connected by the aforementioned point-to-point connection skills. During point-to-point connection (step 901) and data transmission, if the point-to-point connection is interrupted temporarily (step 903), the point-to-point server may relay data transmission between the first device and the second device (step 907). Meanwhile, the first device tries to reconnect or finds another connection flow to connect to the second device. If the point-to-point connection is recovered later, data transmission returns back to the point-to-point connection (step 905). Under such design, even the point-to-point connection is interrupted temporarily, the data transmission between the first device and the second device is still continuing. Thus, better stability is provided.

Figure 10:
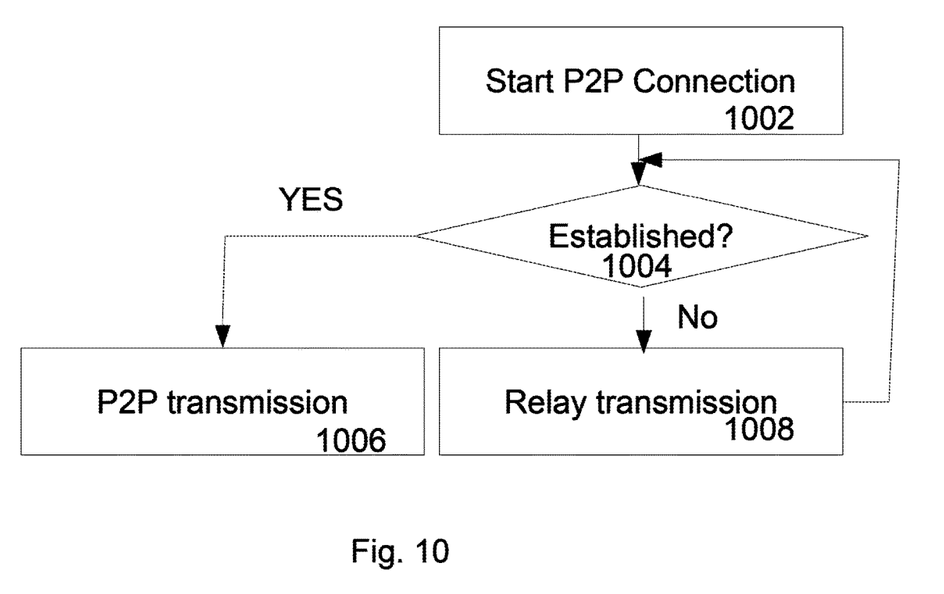
FIG. 10 illustrates data transmission model at early stage during establishment of a point-to-point connection.

FIG. 10 is an improvement for the initial stage of the point-to-point connection. First, the first device tries to establish the point-to-point connection to the second device (step 1002). One or more than one connection flows are tried to establish the point-to-point connection between the first device and the second device. The first device checks whether such point-to-point connection may be established (step 1004). No matter what happens next, before the point-to-point connection is successfully established, data may be relayed by the point-to-point server (step 1008). After the point-to-point connection is established, data may be transmitted via the point-to-point connection. Such skill decrease the waiting time for establishing the point-to-point connection and data relaying is used in this period. In some applications, e.g. IP camera video streaming, such skills bring users much better user experience because point-to-point connection establishing may take several seconds of waiting before any video is transmitted.

In one embodiment, in addition to public or private addresses, the first device and the second device have their unique identification (UID). UIDs may be assigned by a point-to-point server like the server 21 as mentioned above or assigned by manufacturers who make these devices for point-to-point connections. These UIDs may further integrate with user information and a server may be used for maintain and manage such database to manage UIDs and related user information. Under such configuration, the first device may be correlated with other devices registered on the same user or other devices authorized to be accessed by the user. Such mechanism may be integrated to one or multiple embodiments illustrated above.

In addition, the server 21 may be implemented by installing related software one a machine to assist terminal devices to conduct point-to-point connections. The server 21 may also be implemented with software modules running on multiple machines or implemented as an application procedure to be executed on a cloud environment provided by another cloud service provider.

The server 21 may be implemented as a server system for establishing a point-to-point connection between a first device and a second device via a network. The server system may include a network interface for receiving a point-to-point connection request from the first device to be connected to the second device. The network interface may be a wire or wireless network interface. The server system may also have a storage like hard disks, memory or remote storage devices for storing a connection parameter for connecting to the second device via the point-to-point connection; and The server system may also include a processor for providing the first device with the connection parameter and providing the first device with a connection instruction, the connection instruction corresponding to an operating method, the operating method corresponding to at least one connection flow, the first device dynamically determining how to use the at least one connection flow and establishing the point-to-point connection with the second device according to the connection parameter and the connection instruction. The processor may refer to one or more than one processing hardware components. Any conventional servers available at the market may be installed corresponding software module to provide the function as mentioned for the server 21 as mentioned above.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

The invention claimed is:

1. A method for establishing point-to-point connection using a server to assist a first device to connect to a second device via a point-to-point connection, comprising:

receiving a point-to-point connection request from the first device;

providing the first device with a connection parameter for connecting to the second device for the point-to-point connection, wherein the connection parameter includes a linked address of the second device;

providing the first device with a connection instruction;

assigning a plurality of connection flows according to the connection instruction; and with the connection instruction and the connection parameter, using the assigned connection flows to establish the point-to-point connection with between the first device and the second device;

wherein the assigned connection flows comprise a first connection flow, a second connection flow and a third connection flow, the first connection flow indicates the point-to-point server being used for relaying data transmission between the first device and the second device, the second connection flow indicates the data transmission between the first device and the second device being not via the point-to-point server, and the third connection flow indicates Whether the first device and the second device are in the same private network being checked, and if yes, their private network addresses being directly used for establishing the point-to-point connection between the first device and the second device.

2. The method of claim 1, wherein the using step comprises trying the assigned connection flows in a priority order.

3. The method of claim 1, wherein the using step comprises trying the assigned connection flows at the same time.

4. The method of claim 1, wherein the connection instruction comprises a plurality of timeout parameters respectively corresponding to the assigned associated connection flows, and the using step further comprises when one of the assigned connection flows is failed to establish the pointto-point connection between the first device and the second device in the corresponding timeout parameter, the first device tries another of the assigned connection flows to establish the point-to-point connection between the first device and the second device.

5. The method of claim 1, wherein the connection instruction comprises a program code to be executed on the first device to perform the assigned connection flows.

6. The method of claim 1, wherein the connection instruction comprises a pseudo code to be converted to associated logic to operate the first device to perform the assigned connection flows.

7. The method of claim 1, further comprising:
monitoring a connection status of the point-to-point connection between the first device and the second device; and
adjusting a continued connection instruction according to connection status by the server.

8. The method of claim 1, further comprising:
receiving a connection report from the first device to adjust a continued connection instruction.

9. The method of claim 1, wherein when the point-to-point connection between the first device and the second device is interrupted temporarily, the point-to-point server relays data transmission between the first device and the second device until the point-to-point connection between the first device and the second device is recovered.

10. A server system for establishing a point-to-point connection between a first device and a second device via a network, comprising:
a network interface for receiving a point-to-point connection request from the first device to be connected to the second device;
a storage for storing a connection parameter for connecting to the second device via the point-to-point connection; and
a processor for providing the first device with the connection parameter with a linked address of the second device, providing the first device with a connection instruction indicating an assignment of a plurality of connection flows, such that the first device uses the connection flows to establish the point-to-point connection with the second device according to the connection parameter and the connection instruction;
wherein the connection flows comprise a first connection flow, a second connection flow and a third connection flow, the first connection flow indicates the server system being used for relaying data transmission between the first device and the second device, the second connection flow indicates the data transmission between the first device and the second device being not via the server system, and the third connection flow indicates whether the first device and the second device are in the same private network being checked, and if yes, their private network addresses being directly used for establishing the point-to-point connection between the first device and the second device.

11. The server system of claim 10, wherein the connection instruction further indicates a priority order using the assigned connection flows.

12. The server system of claim 10, wherein the connection instruction further indicates trying multiple connection flows at the same time.

13. The server system of claim 10, wherein the connection instruction further indicates timeout parameters respectively corresponding to the connection flows, and when one of the connection flows is failed for establishing the point-to-point connection between the first device and the second device over the corresponding timeout parameter, the first device tries another of the connection flows.

14. The server system of claim 10, wherein the connection instruction comprises a program code to be executed on the first device to perform the corresponding connection flows.

15. The server system of claim 10, wherein the connection instruction comprises a pseudo code to be converted into corresponding operating logic to operate the first device to perform the corresponding connection flows.

16. An electronic apparatus for point-to-point connection, comprising:
a network interface to be connected to a network;
a bus;
an internal memory; and
a processor coupled to the network interface, the bus and the internal memory, for transmitting a connection request to a server to establish a point-to-point connection to a second device, the processor receiving a connection instruction indicating an assignment of a plurality of connection flows and a connection parameter including a linked address of the second device, wherein the processor dynamically determines how to use the connection flows to establish the point-to-point connection to the second device according to the connection parameter and the connection instruction, the connection instruction further indicates timeout parameters respectively corresponding to the connection flows, and when one of the connection flows is failed to establish the point-to-point connection between the electronic apparatus and the second device, the electronic apparatus tries another of the connection flows;
wherein the connection flows comprises a first connection flow, a second connection flow and a third connection flow, the first connection flow indicates the server system being used for relaying data transmission between the first device and the second device, the second connection flow indicates the data transmission between the first device and the second device being not via the server system, and the third connection flow indicates whether the first device and the second device are in the same private network being checked, and if yes, their private network addresses being directly used for establishing the point-to-point connection between the first device and the second device.

17. The electronic apparatus of claim 16, wherein the connection instruction comprises a program code to be executed on the processor to perform the corresponding connection flows.

18. The electronic apparatus of claim 16, wherein the connection instruction comprises a pseudo code to be converted to corresponding execution logic to operate the processor to perform the corresponding connection flows.

* * * * *